United States Patent
Cox et al.

(10) Patent No.: US 8,887,085 B1
(45) Date of Patent: Nov. 11, 2014

(54) DYNAMIC CONTENT NAVIGATION

(75) Inventors: Daniel P. Cox, Auburn, WA (US);
Jeffrey M. Scherpelz, Kirkland, WA (US); Kevin Janhuan Lee, Seattle, WA (US); Peter V. Commons, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 959 days.

(21) Appl. No.: 12/052,511

(22) Filed: Mar. 20, 2008

(51) Int. Cl.
*G06F 3/0485* (2013.01)

(52) U.S. Cl.
USPC .......................................................... 715/786

(58) Field of Classification Search
USPC ......................................... 715/786, 781, 772
See application file for complete search history.

(56) References Cited

U.S. PATENT DOCUMENTS

| | | | | |
|---|---|---|---|---|
| 5,845,084 | A * | 12/1998 | Cordell et al. | 709/234 |
| 6,466,237 | B1 * | 10/2002 | Miyao et al. | 715/838 |
| 7,555,785 | B2 * | 6/2009 | Levy | 726/28 |
| 7,567,542 | B2 * | 7/2009 | Rybak et al. | 370/338 |
| 7,849,403 | B2 | 12/2010 | Joshi et al. | |
| 8,041,701 | B2 * | 10/2011 | Amato et al. | 707/707 |
| 2002/0046052 | A1 * | 4/2002 | Brown et al. | 705/1 |
| 2003/0163478 | A1 * | 8/2003 | Kirkland | 707/102 |
| 2004/0066529 | A1 * | 4/2004 | Wu et al. | 358/1.15 |
| 2005/0278785 | A1 * | 12/2005 | Lieberman | 726/24 |
| 2005/0289468 | A1 * | 12/2005 | Kahn et al. | 715/738 |
| 2006/0028659 | A1 * | 2/2006 | Nishikawa | 358/1.2 |
| 2007/0250705 | A1 * | 10/2007 | Smith et al. | 713/157 |
| 2008/0079972 | A1 * | 4/2008 | Goodwin et al. | 358/1.12 |
| 2008/0174570 | A1 * | 7/2008 | Jobs et al. | 345/173 |
| 2008/0195797 | A1 * | 8/2008 | Sherman et al. | 711/103 |
| 2008/0276164 | A1 | 11/2008 | Bamford | |
| 2008/0282187 | A1 * | 11/2008 | Buschman et al. | 715/784 |
| 2009/0070707 | A1 * | 3/2009 | Schaller et al. | 715/787 |

OTHER PUBLICATIONS

"Lazy Loading is Easy: Implementing a rich domain model", Johannes Broawall, Jul. 18, 2006, https://today.java.net/pub/a/today/2006/07/13/lazy-loading-is-easy.html?page=3#paged-lazy.*
"Lazy Loading", http://en.wikipedia.org/wiki/Lazy_loading.*
"Patterns of Enterprise Application Architecture", Martin Fowler; David Rice; Matthew Foemmel.. 2002. 14 pages.*

* cited by examiner

*Primary Examiner* — Omar Abdul-Ali
*Assistant Examiner* — Haimei Jiang
(74) *Attorney, Agent, or Firm* — Kilpatrick Townsend & Stockton LLP (57) ABSTRACT

Content displayed in a graphical user interface (GUI) such as a Web browser can be dynamically managed based on factors such as a current view or focus position, allowing a user to view information in a list of objects without having to load all the objects at one time, which could slow down operation of the GUI. Where a number of objects to be displayed is known, a page size can be set so that navigational elements of the GUI function as if all the objects are loaded, even though only a portion might be loaded at any given time. A background image can provide information where an object has not yet been loaded, providing a type of temporary content for the entire page without slowing down operation of the GUI.

24 Claims, 8 Drawing Sheets

DYNAMIC CONTENT NAVIGATION

CROSS-REFERENCE TO RELATED CASES

The present application is related to, and incorporates by reference in its entirety, co-pending U.S. patent application Ser. No. 12/052,485, entitled "Dynamic Content Management," filed concurrently herewith.

BACKGROUND

The present disclosure relates generally to, among other things, the displaying of content in an electronic environment, and in particular to dynamically loading content based on a view or focus of a user, application, or client, as well as utilizing navigation elements in a way that appears to a user as if all information on a page is loaded, independent of the amount of information that is actually loaded.

As an ever-increasing amount of information is available electronically, techniques for displaying this information in ways that are useful and intuitive to a user are becoming more complex. For example, a user using a search engine to locate content using key terms might result in tens of thousands, or even millions of results that match those key terms. Users familiar with standard computer-based software expect certain behavior when navigating or scrolling through long lists of material, but in environments such as Internet-based applications such functionality can be difficult to provide.

For example, graphical user interfaces (GUIs) such as Web browsers typically can only render, display, or otherwise convey a certain amount of information while still maintaining an acceptable level of performance. In such an example, it is not practical (or in some cases even possible) to display long lists of content using existing approaches and providing standard navigational functionality. As such, a smaller subset of the results is typically displayed at any given time. A standard way to address this is to display an initial group of the items with the highest relevancy score (or other selected sort order) on a first page, and separate the results so that each subsequent group of relevant items is displayed on a separate "page." While this can be advantageous, as it limits the amount of content that has to be rendered at any given time, users often do not like to have to navigate through multiple pages. For example, if a user navigates to a tenth page of search results and wants to return to a previously viewed result, but does not remember the page that result was on, the user must navigate back through each page until the item is located. Also, in an application such as an online music store where a user might want to see which songs have been purchased for a given artist, the songs might be split over multiple pages such that it is difficult to get a good overview as to which songs that user actually owns.

One approach to solving this problem is to load an initial set of results, such as the first 25 results, then load additional sets of 25 results as the user navigates down a result page. While this solves the problem of loading all the data initially, if the user navigates to the bottom of the page then the GUI still has to render information for all the results at one time, and thus can perform very slowly or even fail to function properly. Further, in GUIs with a scroll bar indicating where a user is viewing relative to a full list of results, the appearance of the scroll bar and size of the draggable thumb will adjust every time an additional set is loaded, such that a user is not able to tell where the user is in the list until the entire list is loaded. For example, in an alphabetical list a user is not able to jump to the items that begin with the letter "n", which typically would be near the middle of the list, as the user has no idea about the actual length of the full list. Another potential problem with such an approach is that when a user scrolls to a portion of a page where nothing has been loaded yet, the user will not see anything in that new portion. Further, there can be a substantial delay until anything appears in that place, as all the information above that portion must first be loaded in order to get to the information in that portion.

It thus is desirable to, among other things, improve the user experience when viewing content in an electronic environment, particularly for large lists, arrays, or other sets of content where the content itself takes up a significant amount of memory or other resources.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to displaying, rendering, or otherwise presenting content in an electronic environment. As used herein, the term "content" can refer to anything that can be displayed or otherwise conveyed to a user, such as through a graphical user interface (GUI), typically in response to a request from the user. A request for content can include any appropriate request sent over an appropriate system or network, such as a request submitted via a Web page over the Internet or a message sent via a messaging system to a content provider, for example.

Figure 1:
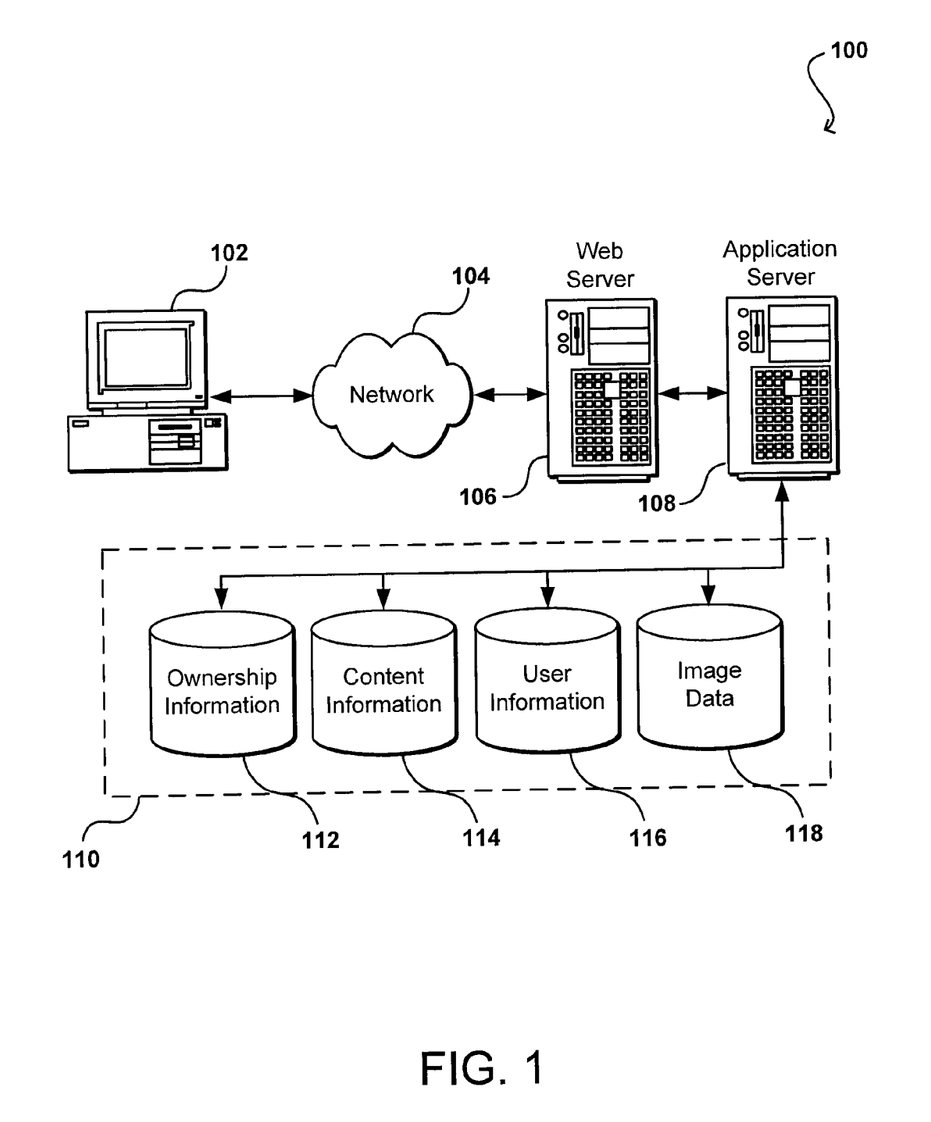
FIG. 1 illustrates a system configuration that can be used in accordance with one embodiment.

FIG. 1 illustrates an example of an environment 100 for implementing aspects in accordance with various embodiments. As will be appreciated, different environments may be used, as appropriate, to implement various embodiments. The environment 100 shown includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of Hypertext Markup Language (HTML) for at least one Web page using hypertext transfer protocols. The handling of all requests and responses, as well as the delivery of content between the client device 102 and the application server 108, can be handled by the Web server.

Each server can include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing ownership data 112, media information data 114, user information 116, and image data 118. It should be understood that there can be many other aspects that may need to be stored in the data store, such as for page image information and access right information, which can be stored in any of the above listed mechanisms as appropriate or in additional mechanisms in the data store 110. The data stored will depend upon the user thereof, as in environments providing for electronic search s data store can include index data or other such information. The data store 110 is operable, through logic associated therewith, to receive instructions from the application server 108, and obtain, update, or otherwise process data in response thereto. In one example, a user might submit a search request for a certain type of content. In this case, the data store might access the user information to verify the identity of the user, and access the ownership information to obtain information about content which the user has previously purchased. The information then can be returned to the user, such as in a results listing on a Web page that the user is able to view via a browser on the user device 102.

Figure 2:
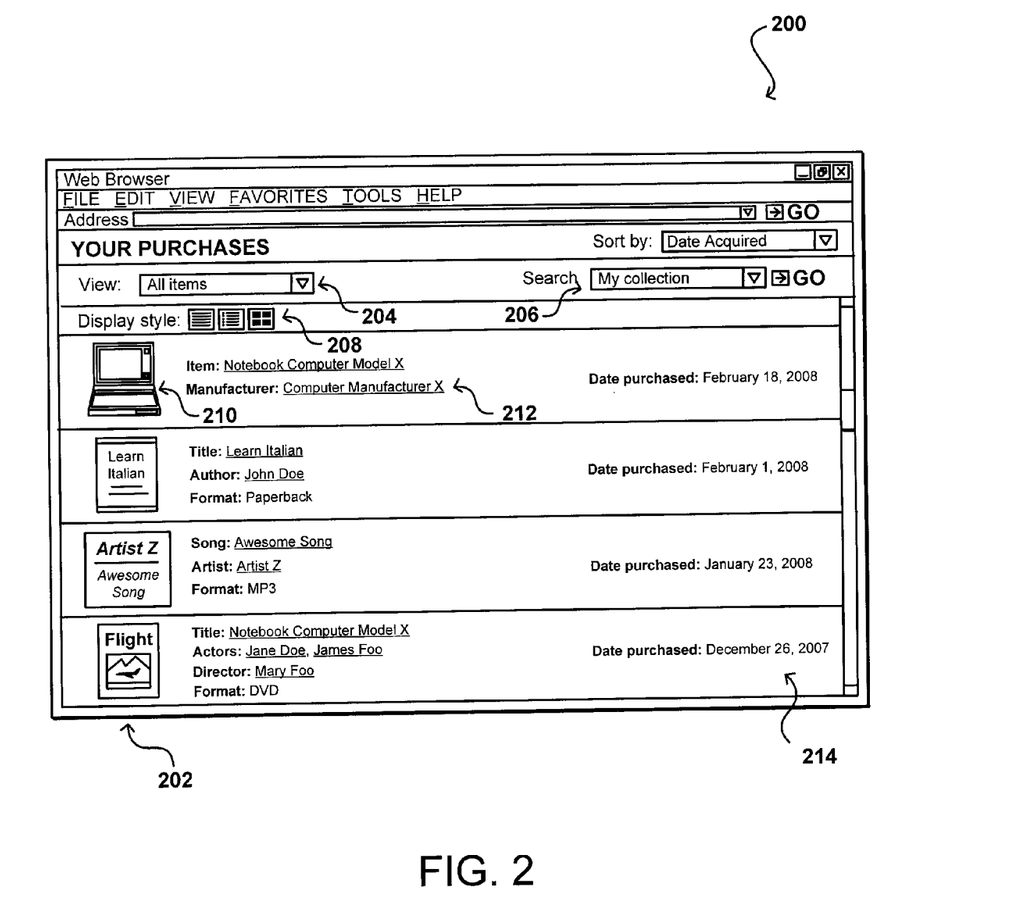
FIG. 2 illustrates an example of a graphical user interface displaying multiple objects in accordance with one embodiment.

For example, FIG. 2 illustrates a graphical user interface window 200 for a browser application on a client device, here displaying a Web page in which a user is able to view information relating to content which the user has previously purchased. While an electronic marketplace or merchant site is used for purposes of explanation, it should be understood that this is merely an example and that any electronic environment where a user or other entity is able to view or otherwise receive or access multiple instances or objects of content can benefit from, and be used with, various embodiments described herein. For example, results returned from a search engine can be loaded and presented in a similar fashion, whether those results are returned locally or across a network. In the example of FIG. 2, a user is able to view information for each item 202 that a user has purchased through a merchant site. As used herein, the term "item" can refer to anything that can be ordered, purchased, rented, used, or otherwise consumed and/or accessed via a network request or electronic submission, such as a product, service, or system. A user can be identified to the system using any appropriate approach known in the art, such as by having the user login to the site, or by storing a cookie for the user's browser. As can be seen the page includes multiple user-selectable options, such as an option to view items of a certain category 204 or search for items using keywords 206, for example, as well as options to change the way in which the results are displayed 208. For each item displayed, there is an image 210 or other object pertaining to the item, and information about the item 212. As is common in many interfaces, there is a scroll bar 214 on the edge of the interface allowing a user to move up and down the page, in order to view other items since not all items may fit in a single browser window view. Other techniques, options, or directions for navigating content on a page can be used as well.

Figure 3:
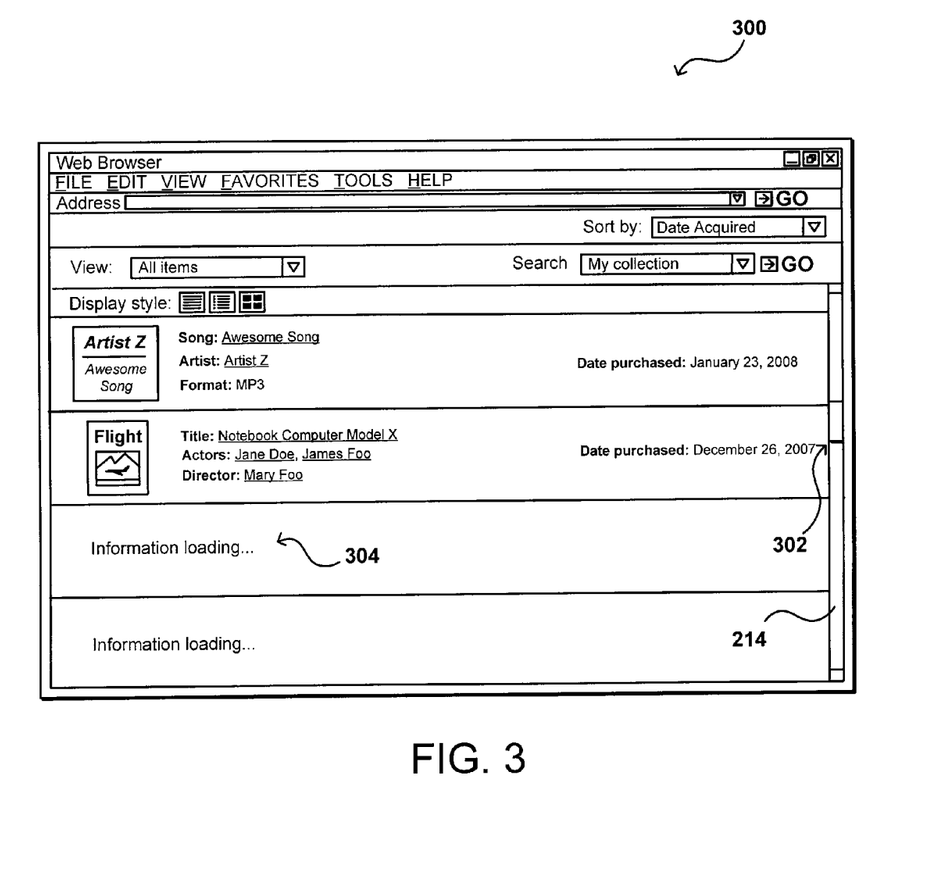
FIG. 3 illustrates a process for dynamically loading content that can be used in accordance with one embodiment.

FIG. 3 shows a case 300 for the example where the user has decided to scroll down the page by moving the draggable thumb 302 of the scroll bar 214. Reference numbers carried over between figures are for convenience of explanation and should not be interpreted as a limitation on the various embodiments. In this embodiment, as will be discussed in more detail later herein, resources are conserved and performance of the GUI optimized by loading substantially only those objects which the user is viewing at any given time. When the user scrolls down, such as is shown in FIG. 3, relative to FIG. 2, it is possible that the user will scroll to a portion of the page for which there is no information yet loaded. In such a case, the page displays to the user that information for that section is loading, here taking advantage of the background image tiling feature of the GUI by showing an "Information loading . . . " or similar image 304 for each position of the page that is in the user's view but has not yet been loaded. Even though the information has not yet been loaded, however, the scroll bar 214 appears as if all the information is present on the page. Assuming the load times are sufficiently quick, such an approach optimizes performance for both the merchant site provider and the user, while providing a desirable user experience.

Figure 4:
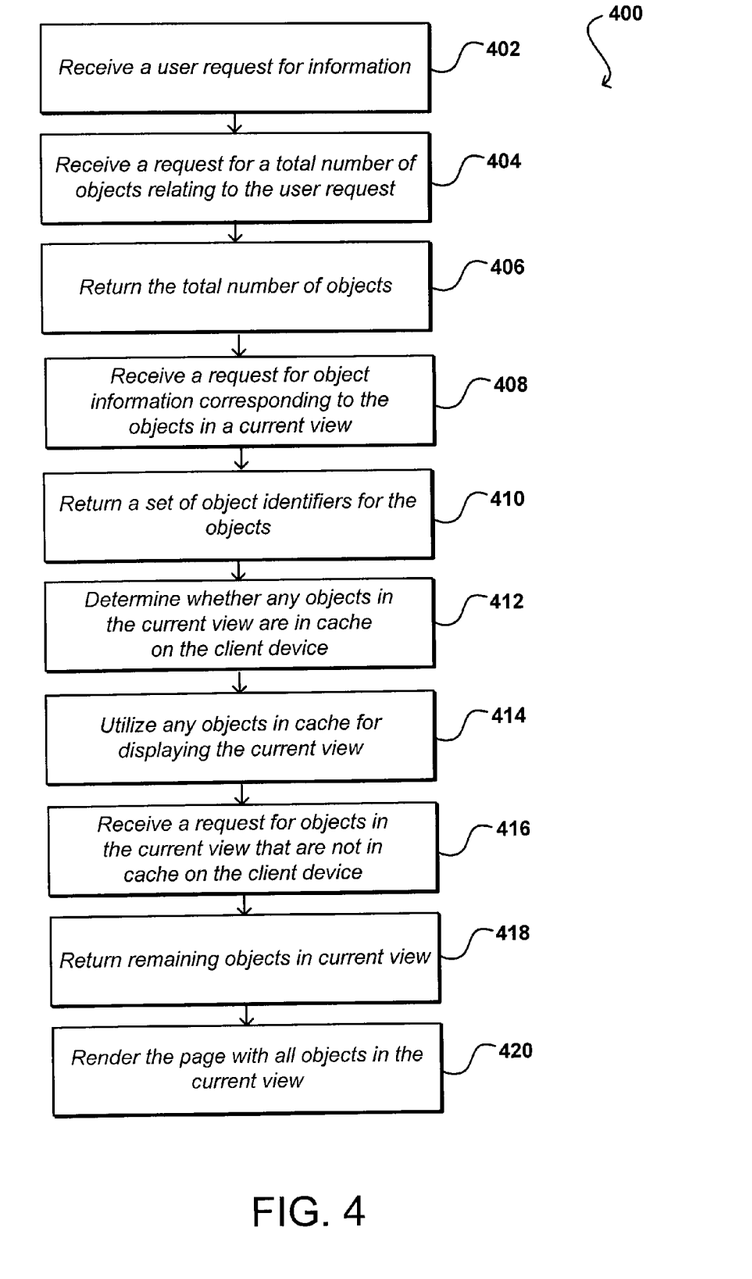
FIG. 4 illustrates a process for dynamically loading content that can be used in accordance with one embodiment.

Such functionality is provided in one embodiment by enabling the dynamic loading and unloading of content on a page, such as a result or detail page, based at least in part upon the view or focus of the user on the page at any given time. FIG. 4 illustrates a process 400 for dynamically loading content in accordance with one embodiment. In this process a user request is received from a user through an appropriate interface 402, the request relating to content to be displayed to the user. The request also could be received from an application, device, or other such source. A user can request search results, for example, using a set of keywords or other search criteria. A request also is received, either as part of the first request or separately, requesting the total or estimated number of items corresponding to the user request 404. The requests can be received by an application server, for example, either directly or indirectly, which is able to trigger execution of the search and return the results to the user making the request. Once the search results are determined, the total (actual or estimated) number of objects is returned to the client device 406. If the number of objects is able to be viewed on the screen at one time, or falls under a threshold number, then all objects can be loaded and there may be no need for dynamic loading and unloading as discussed herein. In such a case, the application or service rendering the display can simply request all the objects to display.

When there are more objects than can be viewed at one time, or at least more than a threshold number, the application or service rendering the interface determines a location, view, or focus of the user with respect to a page to display the results. In an initial page render, this can default to the "top" of the page, or any other appropriate location. If each search result is referred to as an object for purposes of explanation, a request is received for an object identifier for each object that will be displayed in the current view 408. For an initial page render, this can be included as part of either of the previous requests. In some cases, the request will always be for a fixed number of results, such as for identifiers for 20 objects, which will include those objects in the view, and can include a number of objects just outside the view (where the user is most likely to navigate). In other embodiments, this can be based on a detected display size and/or resolution, or a performance of the interface, for example. In other embodiments, the number displayed can be configurable by a user, administrator, or other such person. In some cases the request will only be for those objects which will be at least partially visible in the current view.

In response to receiving the request, the object identifiers for the current view are determined and those identifiers returned to the application 410. The identifiers can be any appropriate identifiers, and approaches for identifying content are well known in the art and will not be discussed herein in detail. Once the object identifiers are received, the application or service rendering the interface on the client device for the user will check to see if any of those objects are stored locally on the client device 412, such as in the cache for a Web browser displaying the results page. If any of those objects are stored locally, the interface can use that information to display the corresponding objects 414. As discussed above, each object can include information such as an image, text, hyperlinks, or any other such information or electronic content. For any objects which are not stored locally for the client device, a request is received specifying the objects requested to be sent to the client device 416. The application server or another appropriate device, application, or service then locates the corresponding object information and returns those objects not in cache to the client device 418. The result page is then rendered including the objects corresponding to the current view 420.

Figure 5:
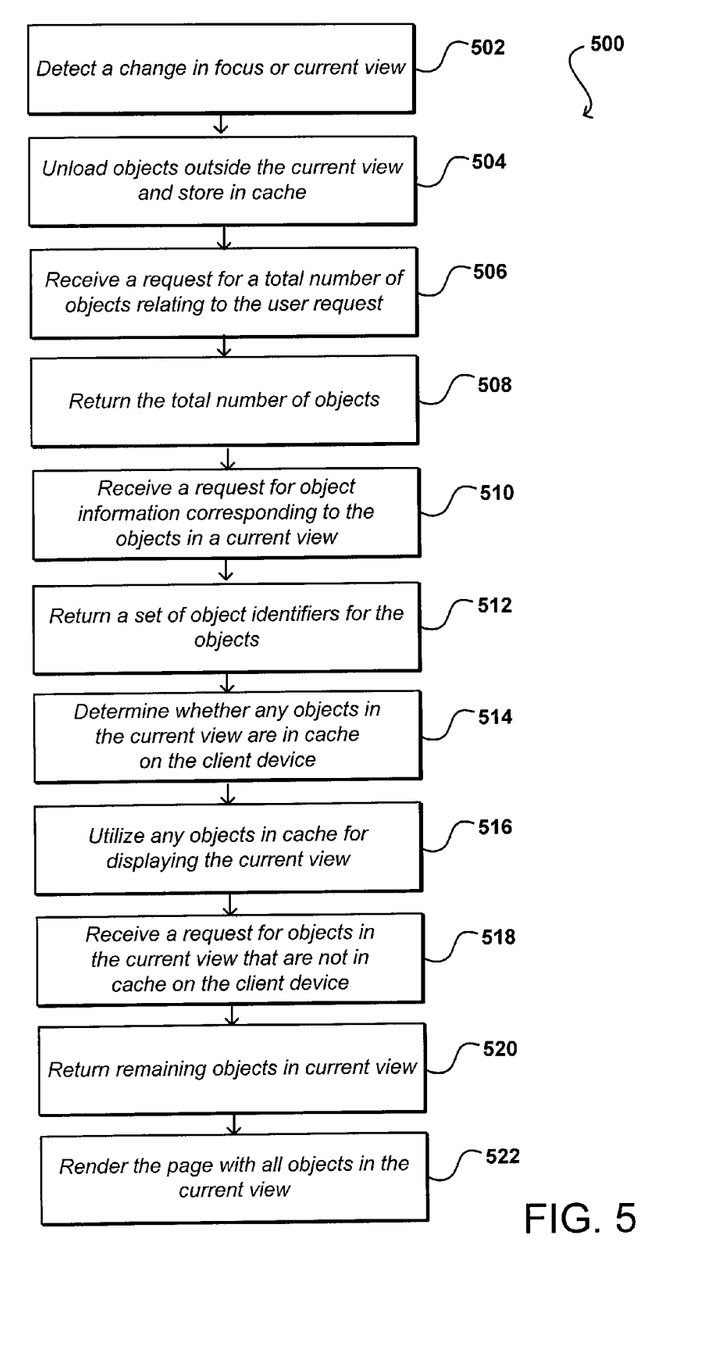
FIG. 5 illustrates a process for dynamically unloading and loading content that can be used in accordance with one embodiment.

FIG. 5 illustrate steps of another part of the example process 500 that detects and addresses a change in the focus or view of the user 502, such as in response to a scroll or movement to a different area of the page, a change in a sort order, or any other action that could result in different viewable objects being displayed. There are various ways to detect such an action. For example, changes in sort order can automatically trigger a new object determination. For simple navigation actions such as a user scrolling down a page, however, an event such as an "on Scroll" event or similar event can be used to trigger a new object determination in response to user navigation. One skilled in the art will appreciate that events, such as the "on Scroll" event, are reported from the respective client applications (e.g. web browsers) to the server (e.g. web server) based on a user's interaction with the client application. However, such events might not be available for all client browsers. In such a case, an approach in one embodiment utilizes a timer event, such as may be programmed in JavaScript to run on a client browser. In one example, a timer event fires once a second to trigger a determination of the current view, focus, or location on the page. If the location is different than the previous location, for example, then a new object determination process is triggered.

In a new object determination process, at least some of the currently loaded objects are unloaded from the rendered page 504. Interfaces such as browsers can store objects in multiple locations, such as in cache, data structures, etc. When an object is not being displayed, that object in one example is unloaded or otherwise removed from a rendering engine for the interface, but may remain at least temporarily in local cache. In some cases all loaded objects are unloaded, while in others only objects out of the current view or focus are unloaded (to avoid unloading an object being viewed by a user). Some embodiments might always leave loaded a number of objects just outside the current view in order to provide better performance when a user is slowly or casually viewing the results. In some embodiments, the unloaded objects are stored locally, such as in a browser or JavaScript cache. These objects can be stored in cache until the page is unloaded, the cache is full, an expiration time is reached, or any other appropriate criteria. Where a cache is substantially full, older objects can be removed as needed.

Once the objects are unloaded, the process can continue similar to that described above with respect to an initial page load. For example, a request is received requesting the total or estimated number of objects corresponding to the user request 506. In cases such as navigation events, this request may not be necessary as the total number of objects on the page may not have changed in some environments. If a request is sent, the total or estimated number of objects is returned to the client device 508. Another request is received for object identifiers corresponding to objects that will be displayed in the current view 510. In response to receiving the request, the object identifiers for the current view are determined and those identifiers returned to the application 512. Once the object identifiers are received, the application or service rendering the interface on the client device for the user will check to see if any of those objects are stored locally on the client device 514, such as in the cache for a Web browser displaying the results page. If any of those objects are stored locally, the interface can simply use that information to display the corresponding objects 516. For any objects which are not stored locally at the client device, a request is received specifying the objects requested to be sent to the client device

518. The application server or another appropriate device, application, or service, then locates the corresponding object information and returns the objects not in cache to the client device 520, and the result page is re-rendered including the objects corresponding to the current (e.g., new) view 522.

Figure 6:
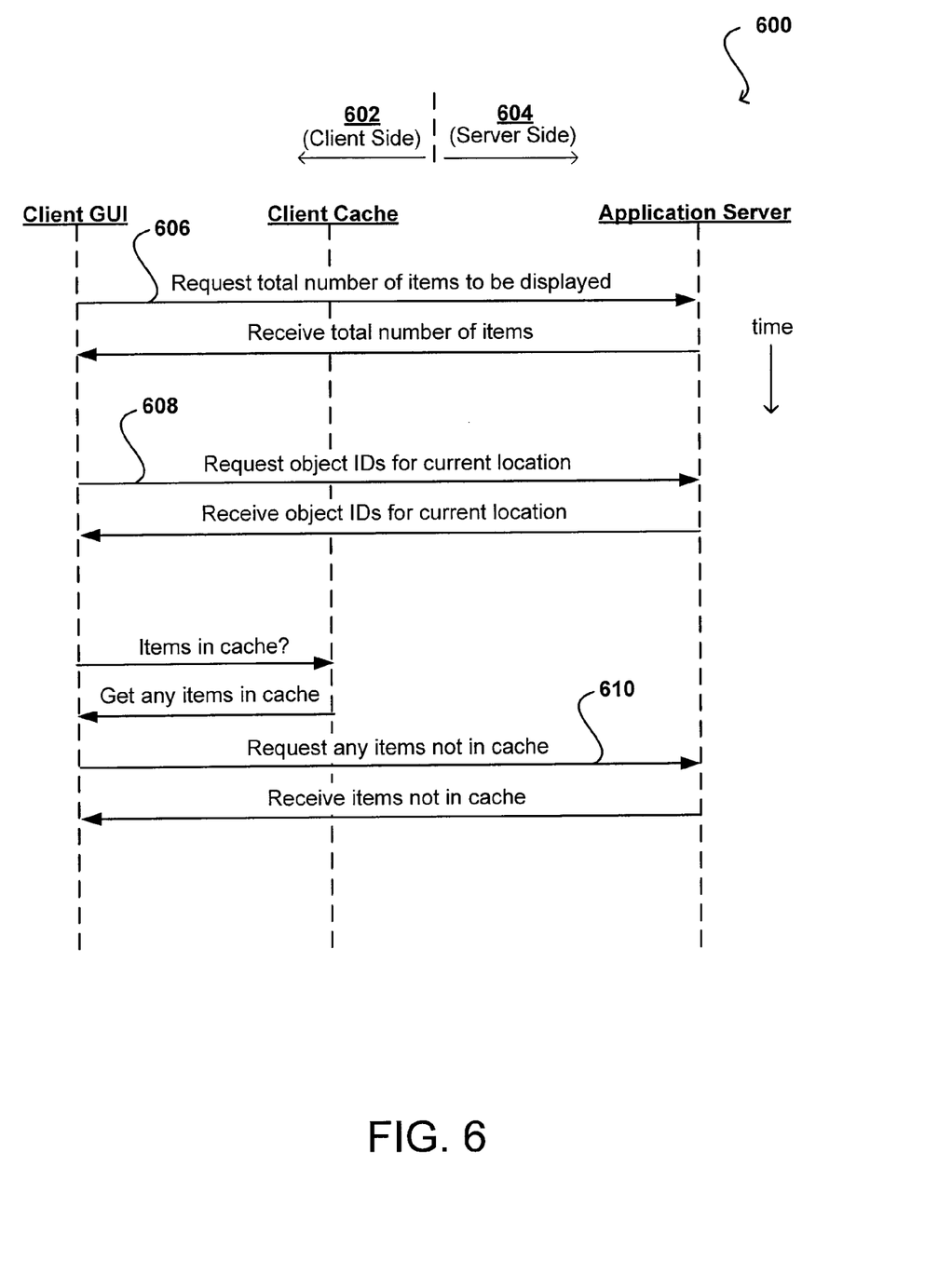
FIG. 6 illustrates a flow of requests or calls for dynamically loading content that can be used in accordance with one embodiment.

One potential advantage of such an approach is that much of the processing occurs on the client device, such as by using JavaScript with a Web browser, thus reducing the amount of time that a given user has to wait for other user requests to be served by the appropriate content provider, Web server, application server, etc. FIG. 6, for example, illustrates a flow diagram 600 displaying calls or requests between a device on the "client side" 602, and at least one device on the "server side" 604. The requests can all be handled by a single API on the server side, for example, such as an API (application programming interface) implemented as part of a Perl Interface or in Java. As can be seen, to render a view on a page there are generally three requests sent to the server side to receive information, with much of the processing done on the client side. For example, when a browser or other GUI application determines that a new view is to be rendered, the browser sends a first, "fast" request 606 to an application server asking for the total number of items, objects, or results corresponding to the current view, as defined in the request by the browser application. An ownership service, for example, can make a fast determination of the number of items and the number can be sent back to the browser. This information can be used, as discussed elsewhere herein, for the browser application to determine how to render the result or detail page. The browser application also can send a second, fast request 608 to the browser to get the object IDs needed for the current location. In some instances, this requires the browser to determine a current view location, determine if the location has changed, determine if new objects might need to be requested that are not otherwise loaded, etc. An ownership service, and any corresponding mapping service that can be used to group category or other information with object information, for example, can quickly determine and return the object identifiers for the current view. In one embodiment, the JavaScript running on the client device requests identifiers for the 20 objects starting at index Y for a particular user in a particular category or filtered set. This can involve, for example, a table including user identifiers and a table including object identifiers, along with a mapping table that has all the categories that each of those object identifiers fit into. A simple JOIN operation between those tables can result in obtaining object identifiers corresponding to a given user and a given filter or category.

Once the browser application receives the list of object identifiers, the browser can determine if the objects are already loaded (in embodiments where the objects are not automatically unloaded before such requests), and also can determine whether any of the non-loaded objects are resident in local memory on the client device or otherwise on the client side. For any such objects, those objects can be retrieved from local storage and loaded accordingly. The browser application then can determine which objects are not stored locally or already loaded, and can send a third, somewhat slower request 610 to the client side to request the full object data and information for any objects not in cache. The slower request in one embodiment takes the form of an AJAX (Asynchronous JavaScript and XML) request to a Perl Interface layer, although many other types of request can be used as well. In one example, a simple "DIFF" operation can be used to determine which objects are not in the cache by looking at the difference of the objects to display and the objects in the cache. In some embodiments, the objects in cache can be displayed while the missing objects are being retrieved from the server. The object information can come from any appropriate content provider or service as described elsewhere herein. A server side device or service can locate the content and transmit the content to the client device, thus being the only true process taking significant resources on the client side. While it is desirable to ensure that a browser application or client device does not do too much work, which can slow down the client device by an unfavorable amount, pushing more processing to the client device improves the performance of the server side system and reduces the server side resources needed to serve such requests.

An approach to dynamically loading and unloading objects for a page in accordance with one embodiment takes advantage of the use of "DIV" elements. DIV elements are elements such as tags typically used to define or group a division, section, or block of a page. DIV elements are commonly used in XHTML+CSS (Extensible HyperText Markup Language and Cascading Style Sheets) documents to position portions of the page. Each object can correspond to a DIV, or division, of the page. When loading content for a page, the content can be broken down in many instances to data elements and graphical elements. While loading text data for the entire page can usually be done without significantly affecting performance, as discussed it is desirable to limit the number of graphical elements loaded for a page. As each loaded image or object will be associated with a DIV (or <div>) in this embodiment, one approach is to maintain a substantially constant number of DIV elements for a page. For example, a detail or result page may have 20 DIVs (and corresponding objects) loaded initially. When a user navigates down the page, the DIVs outside the "active" area of the page can be removed from the page and new DIVs can be added that correspond to the new position. In another approach, the same DIVs are used, but the properties of those DIVs change with a change in navigation according to XHTML+CSS, such as to change the position properties and the image identifiers for each DIV section. Limiting the DIVs in this way allows a browser or similar GUI to generally perform at a very fast rate, without a slow down for pages which otherwise would include a large number of objects. When a DIV is removed or the properties adjusted, the objects and data can be paged out and stored in cache, such as by using JavaScript as discussed above.

Systems and methods in accordance with various embodiments can further build on such functionality to provide a navigational element such as a scroll bar that appears and functions to the user as if all information is loaded for a page, even if only a small portion of the information is actually loaded at any given time. As discussed above, a GUI application such as a Web browser can request a number of objects to be displayed to a user. In many instances the number of objects to be displayed will be a finite number. Since the number of objects to be displayed is known, a page can be rendered that is the appropriate size for all of those objects, even if only a portion of the objects is actually loaded.

Since the number of objects to be displayed is known, as well as the size of each object, an approach in accordance with one embodiment utilizes code (such as in JavaScript) on the client device to create an overall DIV for the page that is of the appropriate size. For example, a DIV for each object might be 100 pixels in height (corresponding substantially) to the height of the object for that DIV) and the width of the page. If there are 250 objects, then an overall DIV corresponding to the page size could be set to 25,000 pixels (250 possible DIVs @ 100 pixels each) in height. A DIV of that length would then cause a scroll bar or any other sizable navigational element of the GUI to be sized according to the full DIV height, regardless of whether only 20 objects are loaded at a time which would be less than 10% of the entire page. As will be discussed in more detail with respect to FIG. 7, a "floating DIV" corresponding to a virtual window around the current view can be specified, which could be 2000 pixels high (20 objects at a time @ 100 pixels each) in this example, such that when a user navigates to another area in a page the floating DIV "moves" to the current view, resulting in the objects within the floating DIV being loaded and any objects outside the floating DIV being unloaded. Any HTML or code also is unloaded from any DIVs outside the current position of the floating DIVs, such that the floating DIV can be empty while images are loaded in the background, and new code inserted accordingly as the images are received or pulled from cache. The loading and unloading can utilize any dynamic process discussed herein, and can pull objects from cache where available. If the objects are not in cache, an AJAX or other request can be sent to retrieve the missing object data.

By sizing a page to the appropriate size, a scroll bar generated by a browser application or other GUI application will automatically be set to the appropriate size. For the "appropriate size," it is understood that a scroll bar typically is approximately the full height of the viewable window of a browser or other GUI wherein content is displayed. The scroll bar will contain a draggable thumb, such as thumb 302 in FIG. 3, which the user drags up and down the scroll bar (or right or left, depending on the scroll bar), in order to navigate between the top and bottom of the page (or other directions or locations). Accordingly, when the thumb is moved to the top of the scroll bar, the view is moved to the top of the page, and when the thumb is moved to the bottom, the view is moved to the bottom of the page. If the page is sized correctly for the number of items to be shown, then moving the thumb of the scroll bar to the middle of the scroll bar will move the view to the middle of the page. As discussed above, users often use such a feature to scroll to an area of the page where the user expects certain information. By correctly sizing the page and scroll bar, this functionality is provided even though no content might be loaded at the location to which the user wishes to scroll.

Further, the size of the thumb along the direction of movement also is an indicator that can be relied upon by the user. As known in the art, if a page is 10 times as long as the viewable window of the GUI, then the thumb will be approximately 1/10 of the length of the scroll bar, such that the user not only gets an indication of where the user is on the page, but also how many other views are available on the page (i.e., a thumb that is 1/10 the length of the scroll bar indicates to the user that there are about 10 times as many portions of the page as the portion being currently viewed). By properly sizing the page, the thumb will be sized accordingly such that the user also can rely upon this functionality, even if content is only loaded for the current view. As discussed in previous approaches where content is added as a user scrolls down, each "add" would result in the thumb length and position being updated, which is of little benefit to the user when attempting to determine where the user is in the overall list of results.

In some embodiments, images shown for each object are sized or automatically resized so that the images are all the same height, and any text or other content is selected or rendered so that the height allocated to display each object is constant. By utilizing a constant height for each object, a browser can easily determine the proper length for a page by multiplying the number of objects by the object height (and adding any header or footer information as necessary). In cases where the object heights are not the same, the request to get the number of items or the request to get the object identifiers can include, or be accompanied by, a request for the height needed for each object. In such embodiments, the GUI rendering engine then can, for example, add the total height for all the objects and size the page accordingly.

When a user scrolls down to an area where there is no object data loaded, it can be undesirable for the user to simply see a blank screen with no information. While it would be possible to load a generic image for each object location, such an approach still requires the GUI application to store information for each instance, which for thousands of objects can cause the application to slow or even fail to operate correctly. Accordingly, an approach in accordance with one embodiment takes advantage of a background image or similar feature of a GUI as known in the art. A background image generally is a single image that can be repeated or "tiled" behind any content or information displayed on a page, with a number of instances of the image only requiring one background image to be loaded. By sizing the background image to the size of an object, or a multiple of the size of an object, a user can be presented with an appropriate image at each location where an object is to be displayed, without significant additional use of resources. For example, FIG. 3 illustrates a page after a user has scrolled down to a point where no data is loaded for two of the objects displayed. If the page is sized correctly for the total number of objects, and the size of the objects is fixed, then tiling a background image can give the appearance to the user that something is being done in that space to provide the content, without having to specifically render anything for that space. As shown in FIG. 3, the image includes text saying "Information loading . . . ", which indicates to the user that content will be shortly forthcoming.

Figure 7:
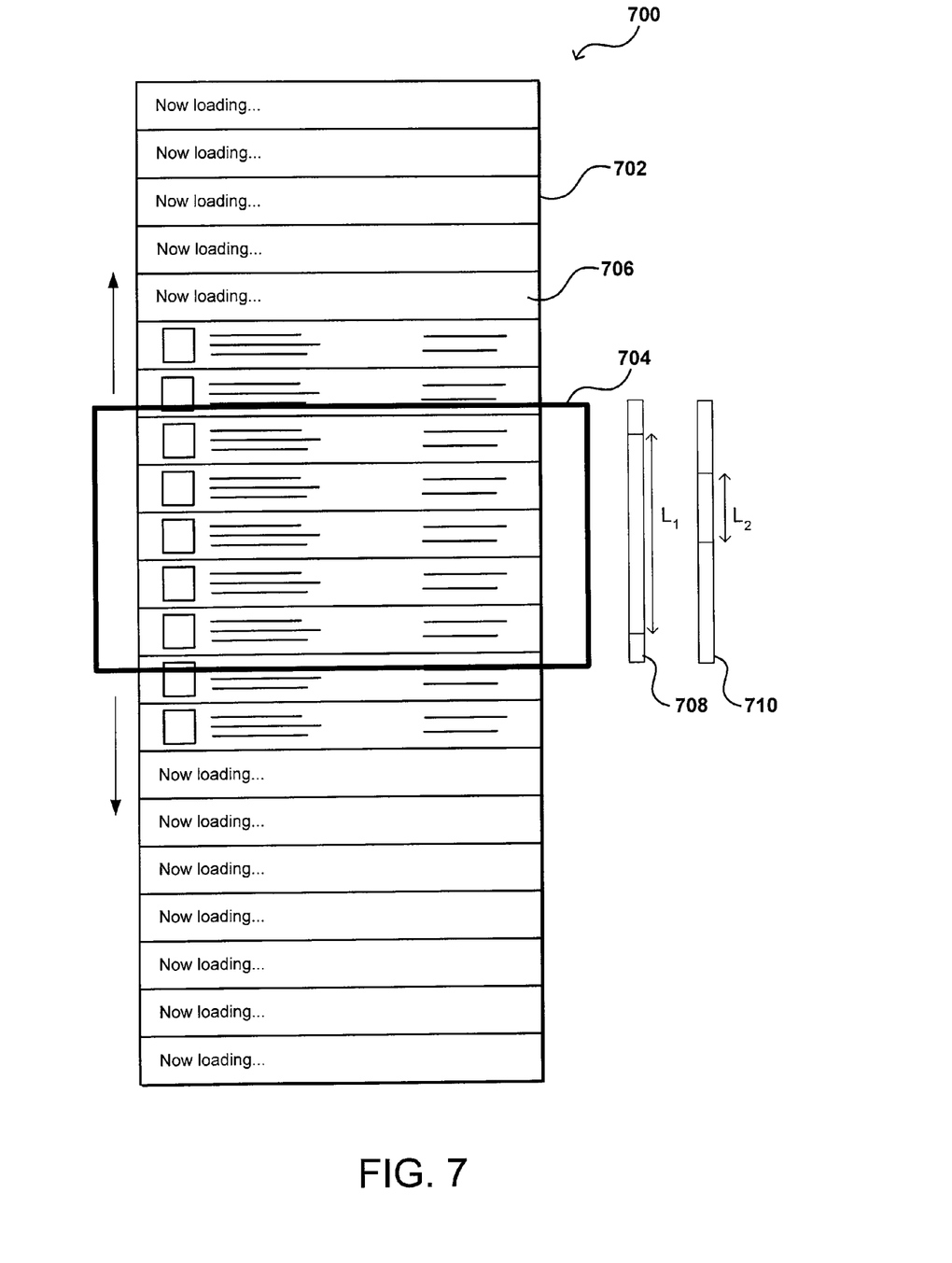
FIG. 7 illustrates a virtual sliding window useful for dynamically loading content that can be used in accordance with one embodiment.

A better understanding of a sizing process in accordance with one embodiment can be obtained through explanation of a page setup 700 as illustrated in FIG. 7. In this example, it is determined that there are 21 total objects to be displayed. Since the number of objects and the object sizes are known, a navigable size needed to display and/or navigate to all the objects is calculated, such as a length and/or width of a page to be displayed in a GUI. Accordingly, a page 702 is rendered as discussed elsewhere herein which is long enough to display all 21 objects, thus having the calculated navigable size. A viewable portion of the GUI used to display the page, based on factors such as screen size and resolution, will only allow for a subset of the page or a portion of the navigable size to be displayed. Here, this viewable portion, or a portion slightly larger than the viewable portion, is represented by a dynamic and moveable (virtual) window 704. As can be seen, the window indicates that portions of up to 7 objects can be viewed at any one time. The moveable window can be moved up or down the page, depending upon the navigation of the user. The GUI can use requests as discussed above to load objects in the region of the page corresponding to the moveable window, and unload objects when the window moves to another portion of the page. The GUI also can load images just above and/or below the window in order to attempt to load images where the user is most likely to navigate next, thus improving the performance from the perspective of the user, and appearing as if all the content is loaded at one time. Also as described, a background image 706 can be set to the size of an object field and tiled so that the background image appears at each object field location. Thus, if a user scrolls quickly to an area where no content is loaded, the user will understand that information is loading for that object field.

FIG. 7 also illustrates two scroll bars 708, 710 each corresponding to the height of the viewable area of the GUI displaying objects in response to the user request. The first scroll bar 708 illustrates the size and position of the draggable thumb if the scroll bar was based on only the loaded objects. As can be seen, the thumb is about ¾ of the length of the scroll bar, as about 75% of the loaded objects are viewable. This would give no indication to the user that the user is actually slightly closer to the top of the list, or that there are many more objects above and below the current position. The second scroll bar 710 illustrates the size and position of the draggable thumb when the scroll bar is based on the overall size of the page, or the properly-sized overall DIV, regardless of how many objects are actually loaded. As can be seen, the thumb indicates that the user is closer to the top of the list, and indicates that the user is only seeing about 25% of the overall list. Since this example loads objects just above and below the moving window, and since the scroll bar is set for the whole page, a user scrolling at a normal rate would not necessarily even notice that not all the objects are loaded at any time, as the objects would always be present in the current view and, the scroll bar does not change (other than the position of the thumb as determined by the user). Further, the performance of the browser or client device is not negatively impacted by the overall number of objects in the list.

Figure 8:
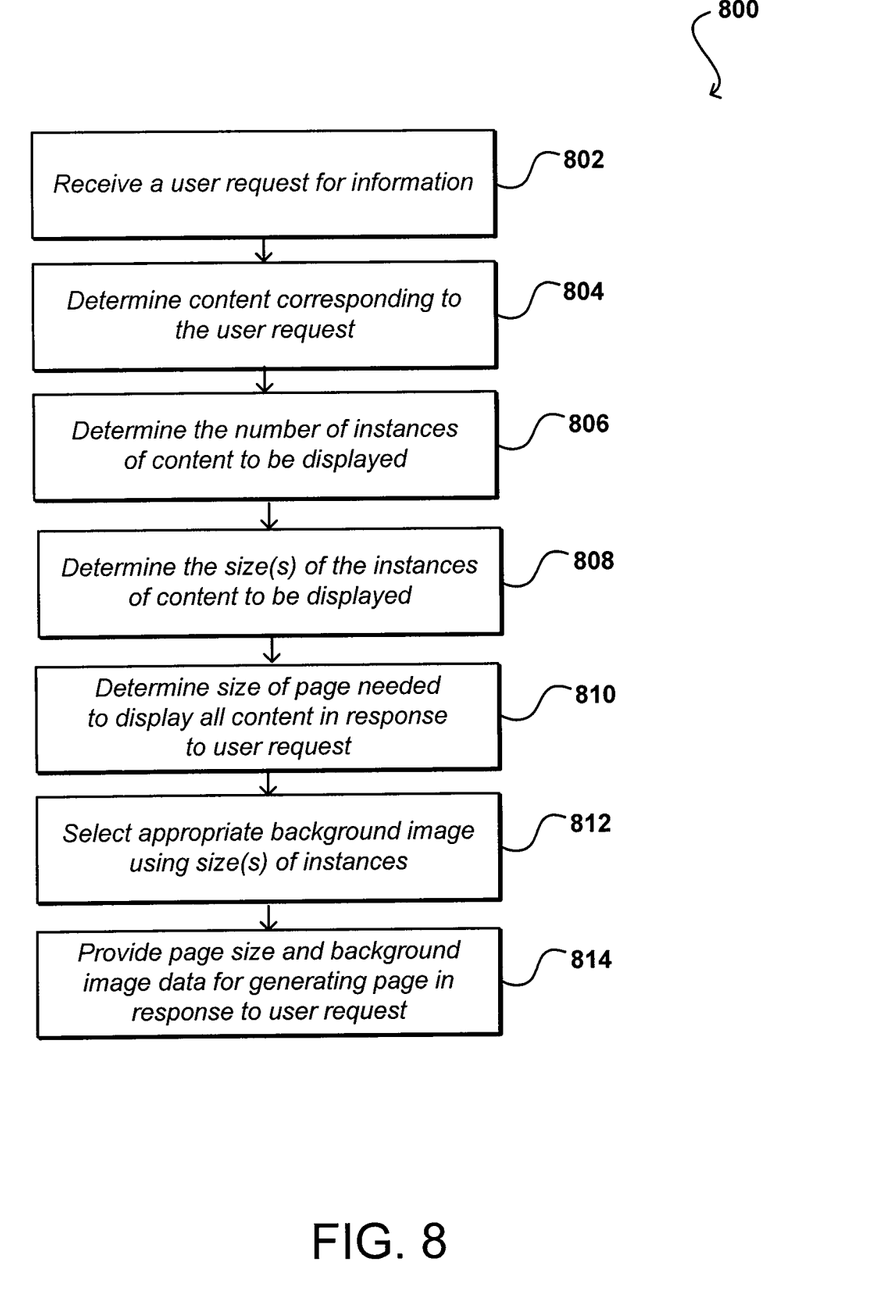
FIG. 8 illustrates a process for setting page size and navigation elements that can be used in accordance with one embodiment.

FIG. 8 shows an example of a process 800 for providing an accurate scroll-bar for a page even when only a portion of the contents of a page are loaded. In this process, a request for the page is received 802, such as from a client device of a user. In response to the user request, a set of content is determined that would be displayed on the page if all the content were to be loaded at one time 804. Determinations are made of the amount of content 806 and the size of each instance of content 808, where the content can be of the same size, adjusted to be of the same size, or may include different sizes. Using the determined amount and size of the content, and potentially other information such as user screen resolution or preferences, a size of a page is determined that would be necessary to display all the content 810. In an embodiment where not all content will be loaded at least initially, or where some content will be unloaded from the page, an appropriate background image can be selected 812. A background image can be selected to include information indicating that content is loading when a user navigates to a portion of the page where content is not currently loaded, and can be sized to substantially match the size(s) of the instances of content. The size of the page and the background image then can be provided as information used to render the page on a client device 814, where the page will have the background image tiled throughout and will have a scroll bar sized to the entire page, regardless of the portion of the content that is loaded at any given time. In some cases, JavaScript can be used to specify the size of the page to be rendered on the client device, although other approaches for setting the size of the page can be used as well.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for displaying content in a Web browser using a dynamic scroll bar, comprising:
   receiving a first request relating to objects to be included on a Web page to be displayed in a Web browser on a client device;
   providing a value corresponding to a total number of objects capable of being displayed on the Web page in response to the first request;
   providing a Web page area usage for at least a subset of the objects to be included on the Web page, such that the client device is able to use the value and the Web page area usage for at least the subset of the objects to generate the Web page of an appropriate size to include a placeholder representation of the objects independent of a number of the objects actually displayed, a size of individual placeholder representations correspond to a display size or resolution associated with a respective object of the subset of the objects to be included on the Web page, wherein the display size corresponds with a visible portion of the Web page to display the respective object of the subset of the objects;
   selectively providing a first set of the objects corresponding to an initial viewport location of the Web page in the Web browser, such that the client device is able to load the first set of the objects onto the Web page to be viewable through the Web browser without loading all of the objects, the first set of the objects having a number of objects less than the total number of objects;
   receiving a second request identifying a current viewport location that is different from the initial viewport location of the Web page, the second request being based at least in part on a user selection to move the initial viewport location of the Web page to the current viewport location of the Web page;
   providing, based at least in part on the received second request, a second set of objects corresponding to the current viewport location of the Web page in the Web browser, wherein the second set of objects contains at least one object that is not included in the first set of the objects; and
   unloading, based at least in part on the received second request, one or more objects of the first set of the objects such that the placeholder representation is used in place of the unloaded one or more objects.

2. A method according to claim 1, further comprising:
   providing a background image to the client device to use as the placeholder representation, such that the Web page is able to display the background image where no object is loaded, wherein the background image is tiled such that the background appears in at least a subset of positions where the at least one of the objects would appear if that object were loaded.

3. A method according to claim 1, wherein:
   a determination of an appropriate Web page area usage, a generation of the Web page, and a loading of objects onto the Web page are done on the client device.

4. A method for displaying content in a user interface with a navigational element, comprising:
   receiving a request relating to a set of objects to be displayed in a user interface on a client device;
   in response to the request, providing placeholder information comprising a value corresponding to a total number of the set of objects capable of being displayed in the user interface;
   without loading the set of objects, generating for display a Web page with a navigable size that can accommodate the set of objects, such that a navigational element for the user interface is functional so as to indicate to the user a current viewport location with respect to the Web page using the placeholder information;
   identifying a subset of the set of the objects based at least in part on the current viewport location of the Web page in a Web browser, the subset having a number of objects less than the total number;
   loading the identified subset of objects for display on the Web page such that at least a portion of the placeholder information is replaced with the identified subset of objects, a size of individual placeholder representations corresponding to a display size or resolution associated with a respective object of the subset of objects to be included on the Web page, wherein the display size corresponds with a visible portion of the Web page to display the respective object of the subset of the objects;
   receiving a second request identifying a second viewport location that is different from the current viewport location of the Web page; and
   unloading, based at least in part on the received second request, one or more of the identified subset of objects for display on the Web page such that the placeholder information is used in place of the unloaded one or more of the identified subset of objects.

5. A method according to claim 4, further comprising: providing a web page area usage of an object of the set of objects to be displayed, wherein the client device is able to use the value corresponding to the total number of the set of objects and the web page area usage for the object of the set of objects to calculate a total web page area that can accommodate the total number of the set of objects in the user interface.

6. A method according to claim 4, wherein the subset of objects is a first subset of objects and the current viewport location is a first viewport location of the Web page, the method further comprising:
   identifying a second subset of objects based on a second viewport location of the Web page, wherein the second subset of objects overlaps only partially and not completely with the first subset of objects; and
loading the identified second subset of objects for display on the Web page.

7. A method according to claim 4, wherein:
the client device is able to render the subset of the set of objects to be viewable through the user interface, the navigational element functioning as if all of the set of objects are rendered for display instead of only the subset of the set of objects.

8. A method according to claim 4, wherein:
the navigational element is a scroll bar, and wherein a size and position of a draggable thumb of the scroll bar corresponds to the navigable size, regardless of how many of the set of objects are rendered for display in the interface.

9. A method according to claim 4, further comprising:
providing a background image to the client device such that the user interface of the client device is able to display the background image where no object is loaded.

10. A method according to claim 9, wherein:
the background image is selected to indicate to a user that an object will be loaded at any location of the background image when no object is loaded at that location.

11. A method according to claim 10, wherein:
the background image is tiled such that the background image appears in a position where an object from the set of objects would appear if that object from the set of objects were rendered for display.

12. A method according to claim 4, wherein:
the displaying, the identifying, and the loading of objects onto the Web page are done on the client device.

13. A method according to claim 4, further comprising:
providing information regarding the subset of the set of objects in response to a movement of the navigational element.

14. A method according to claim 4, further comprising:
causing the set of objects to be sized to a common size before being rendered for display.

15. A method for displaying content in a user interface with a navigational element, comprising:
sending a request corresponding to a user search for a set of objects to be displayed through a user interface;
receiving a value corresponding to a total number of the set of objects capable of being displayed;
using the value corresponding to the total number of the set of objects and a size for at least a subset of objects in the set of objects to calculate a navigable size needed for a Web page to display the total number of the set of objects in the user interface using placeholder information, such that a navigational element for the user interface is functional so as to indicate to a user a current viewport location within the Web page that has the navigable size, the placeholder information including a display size or resolution corresponding to the size associated with a respective object of the set of objects to be included on the Web page, wherein the display size corresponds with a visible portion of the Web page to display the respective object of the set of objects;
based on an initial viewport location in the Web page, loading a subset of the set of objects, the subset having a number of objects less than the total number of the set of objects;
sending a second request identifying a second viewport location that is different from the initial viewport location of the Web page, the second request being based at least in part on a user selection to move the initial viewport location of the Web page to a second viewpoint location of the Web page; and
unloading, based at least in part on the second request, at least one of the subset of the set of objects on the Web page such that the placeholder information is used in place of the unloaded at least one of the subset of the set of objects.

16. A method according to claim 15, further comprising:
receiving a size for at least one object of the set of objects.

17. A method according to claim 15, further comprising:
requesting the subset of the set of objects corresponding to the initial viewport location; and
rendering the subset to be viewable through the user interface, the navigational element functioning as if all of the set of objects are loaded on the Web page instead of only the subset of the set of objects.

18. A method according to claim 15, wherein:
the navigational element is a scroll bar, and wherein a size and position of a draggable thumb of the scroll bar corresponds to the navigable size, regardless of how many objects are loaded.

19. A method according to claim 15, further comprising:
including a background image, such that the user interface is able to display the background image where no object is loaded.

20. A method according to claim 19, wherein:
the background image is selected to indicate to a user that an object will be loaded at any location of the background image when no object is loaded at that location.

21. A system for displaying content in a user interface with a navigational element, comprising:
a processor; and
a memory device including instructions that, when executed by the processor, cause the processor to:
transmit a first request relating to objects to be displayed in a user interface on a client device;
in response to the first request, receive a value corresponding to a total number of objects capable of being displayed in the user interface;
display a Web page with a navigable size that can accommodate the total number of objects using placeholder information, such that a navigational element for the user interface is functional in indicating to a user a current viewport location with respect to the Web page, the placeholder information associated with a size of a placeholder corresponding to a display size or resolution associated with at least a subset of the objects to be included on the Web page, wherein the display size corresponds with a visible portion of the Web page to display the placeholder;
selectively load a first plurality of objects in the Web page based at least in part on the current viewport location of the user in the Web page, the first plurality of objects corresponding to the current viewport location of the user in the Web page and the first plurality of objects having a number of members that is smaller than the total number of objects;
detect a change in the current viewport location of the user in the Web page to a second viewport location, the second viewport location being based at least in part on a user selection to move the current viewport location of the Web page to a second viewport location of the Web page;
provide, based at least in part on the detected change, a second set of objects corresponding to the current viewport location of the Web page in a Web browser, wherein the second set of objects contains at least one object that is not included in the first plurality of objects; and unload, based at least in part on the detected change, at least one of the first plurality of objects such that placeholder information is used in place of the at least one of the first plurality of objects to maintain a same number of objects loaded within the Web page.

22. A system according to claim 21, wherein at least one of the loaded objects remains loaded after the change in the current viewport location of the user in the Web page.

23. A non-transitory computer readable medium storing a computer program for displaying content in a user interface with a navigational element, the computer program comprising sets of instructions for:

constructing a Web page with a navigable size that can accommodate a set of objects using at least one placeholder element, such that the navigational element for the user interface is functional so as to indicate to a user a current viewport location in the Web page without loading all of the set of objects, a size of a placeholder element corresponding to a display size or resolution associated with a respective object of the set of objects to be included on the Web page, wherein the display size corresponds with a visible portion of the Web page to display the respective object of the set of objects;

selectively loading a first subset of the set of objects based at least in part on the first subset corresponding to an initial viewport location of the Web page through a Web browser, the first subset having a cardinality less than the cardinality of the set;

receiving a request identifying a second viewport location that is different from the initial viewport location in the Web page, the request being based at least in part on a user selection to move the initial viewport location in the Web page to the second viewport location in the Web page;

loading a second subset of the set of objects to replace the at least one placeholder element based at least in part on the received request, the second subset of the set of objects corresponding to the second viewport location and having a cardinality less than the cardinality of the set, wherein the second subset of the set of objects contains at least one object that is not included in the first subset of the set of objects; and unloading, based at least in part on the received request, at least one of the first subset of the set of objects such that at least one placeholder element is used in place of the at least one of the first subset of the set of objects to maintain a same number of objects loaded within the Web page.

24. The non-transitory computer readable medium according to claim 23, wherein the computer program further comprises a set of instructions for:

selectively unloading a third set of objects outside of the second viewport location comprising at least one of the first subset of the set of objects, the selectively unloading at least in part on the request.

* * * * *